(12) United States Patent
Kikuchi

(10) Patent No.: US 12,522,076 B2
(45) Date of Patent: Jan. 13, 2026

(54) ELECTRIC VEHICLE

(71) Applicant: ISUZU MOTORS LIMITED, Yokohama (JP)

(72) Inventor: Takuya Kikuchi, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/644,230

(22) Filed: Apr. 24, 2024

(65) Prior Publication Data
US 2024/0359564 A1 Oct. 31, 2024

(30) Foreign Application Priority Data
Apr. 27, 2023 (JP) ................. 2023-073734

(51) Int. Cl.
| | | |
|---|---|---|
| *B60L 3/04* | (2006.01) | |
| *B60L 3/00* | (2019.01) | |
| *B60L 50/60* | (2019.01) | |
| *H02J 7/00* | (2006.01) | |

(52) U.S. Cl.
CPC ............. *B60L 3/04* (2013.01); *B60L 3/0046* (2013.01); *B60L 50/60* (2019.02); *H02J 7/0031* (2013.01); *H02J 7/0063* (2013.01)

(58) Field of Classification Search
None
See application file for complete search history.

(56) References Cited

U.S. PATENT DOCUMENTS

| | | | | |
|---|---|---|---|---|
| 2015/0375621 A1* | 12/2015 | Ono | .................. | B60L 1/006 |
| | | | | 307/10.1 |
| 2016/0243954 A1* | 8/2016 | Moro | .................. | B60L 53/14 |
| 2020/0274375 A1* | 8/2020 | Griffiths | ............... | H02J 7/24 |

FOREIGN PATENT DOCUMENTS

| | | |
|---|---|---|
| JP | 2011-205755 A | 10/2011 |
| JP | 2013169087 A | 8/2013 |
| JP | 2015-095934 A | 5/2015 |
| JP | 2016-073110 A | 5/2016 |
| JP | 2016101033 A | 5/2016 |
| JP | 2019122062 A | 7/2019 |
| WO | 2012-060009 A1 | 10/2012 |

\* cited by examiner

*Primary Examiner* — Rexford N Barnie
*Assistant Examiner* — Aqeel H Bukhari
(74) *Attorney, Agent, or Firm* — Shih IP Law Group, PLLC

(57) ABSTRACT

An electric vehicle includes: a third power supply line that supplies power from a quick charger placed outside the vehicle body to a battery, a positive-side line being on an upstream side of a current flowing from the quick charger to the battery, a negative-side line being on a downstream side the current flowing from the quick charger to the battery; a third protection circuit that is capable of cutting off the power via the third power supply line by electrically disconnecting the positive-side line and/or the negative-side line; and a control section that executes control for electrically disconnecting between the battery and the third power supply line when determining, based on a detection result of a third detection section, that the third protection circuit is in a state where each of the positive-side line and the negative-side line is not disconnectable.

1 Claim, 5 Drawing Sheets

ELECTRIC VEHICLE

CROSS REFERENCE TO RELATED APPLICATIONS

The entire disclosure of Japanese patent Application No. 2023-073734 filed on Apr. 27, 2023, is incorporated herein by reference in its entirety.

BACKGROUND

Technological Field

The present disclosure relates to an electric vehicle.

Description of Related Art

In general, an electric vehicle is a vehicle equipped with a battery and a motor for traveling driven by power from the battery.

The battery may be charged at a high voltage by a quick charger placed outside the vehicle.

For example, Japanese Patent Application Laid Open No. 2011-205755 describes an electric vehicle including: a battery; a quick charger; a power supply line that supplies power from the quick charger to the battery; a relay circuit installed on the power supply line; a detection section that detects a state of the relay circuit; and a determination section that determines, based on a detection result of the detection section, whether the relay circuit has a welding failure (closing failure).

Incidentally, the power supply line includes a positive-side line that is on an upstream side of current flowing from the quick charger to the battery and a negative-side line that is on a downstream side thereof. The relay circuit is installed on the power supply line and is capable of electrically disconnecting the positive- and/or negative-side line(s). Examples of the welding failure include a single welding in which either the positive-side line or the negative-side line cannot be electrically disconnected and a double welding in which each of the positive-side line and the negative-side line cannot be electrically disconnected.

Since the control apparatus described in Japanese Patent Application Laid Open No. 2011-205755 is not configured to electrically disconnect between the power supply line and the battery when the relay circuit has the double welding, it may be difficult to surely perform protection of the battery.

SUMMARY

Technical Problem

An object of the present disclosure is to provide an electric vehicle capable of surely performing protection of a battery.

To achieve the above-mentioned object, an electric vehicle in the present disclosure includes:
a battery that supplies power to an electric motor for operation of a vehicle body;
a third power supply line that includes a positive-side line and a negative-side line and that supplies the power from a quick charger placed outside the vehicle body to the battery, the positive-side line being on an upstream side of a current flowing from the quick charger to the battery, the negative-side line being on a downstream side the current flowing from the quick charger to the battery;
a third protection circuit that is installed on the third power supply line and that is capable of cutting off the power by electrically disconnecting the positive-side line and/or the negative-side line;
a third detection section that detects a state of the third protection circuit; and
a control section that executes control for electrically disconnecting between the battery and the third power supply line when determining, based on a detection result of the third detection section, that the third protection circuit is in a state where each of the positive-side line and the negative-side line is not disconnectable due to a double welding of the third protection circuit.

Further, to achieve the above-mentioned object, an electric vehicle in the present disclosure is an electric vehicle that includes: a mounted object operated by power; and a vehicle body equipped with the mounted object, in which the vehicle body includes:
a first power supply line that supplies power from a battery to the mounted object, the battery being mounted on the vehicle body;
a first protection circuit that is installed on the first power supply line and that is capable of supplying and cutting off the power by closing or opening;
a first detection section that detects a state of the first protection circuit;
a reception section that receives predetermined information; and
a control section,
in which the mounted object includes:
a second power supply line that is electrically connected to the first power supply line;
a second protection circuit that is installed on the second power supply line and that is capable of supplying and cutting off the power by closing or opening;
a second detection section that detects a state of the second protection circuit; and
a transmission section that transmits a detection result of the second detection section as the predetermined information, and
in which
the control section executes control such that no power is supplied from the battery to the mounted object in a case where the state of the first protection circuit is a closing failure and the detection result of the second detection section indicates an indefinite initial value or indicates that the state of the second protection circuit is an open state, the closing failure being a failure in which opening is impossible due to a failure.

Further, to achieve the above-mentioned object, an electric vehicle in the present disclosure is an electric vehicle that includes: a mounted object operated by power; and a vehicle body equipped with the mounted object, in which the vehicle body includes:
a first power supply line that supplies power from a battery to the mounted object, the battery being mounted on the vehicle body;
a first protection circuit that is installed on the first power supply line and that is capable of supplying and cutting off the power by closing or opening;
a first detection section that detects a state of the first protection circuit;
a reception section that receives predetermined information; and
a control section, in which the mounted object includes:
- a second power supply line that is electrically connected to the first power supply line;
- a second protection circuit that is installed on the second power supply line and that is capable of supplying and cutting off the power by closing or opening;
- a second detection section that detects a state of the second protection circuit; and
- a transmission section that transmits a detection result of the second detection section as the predetermined information, and in which
the battery includes a fourth protection circuit that is capable of cutting off the power supplied to the mounted object, and
the control section controls the fourth protection circuit such that the power supplied to the mounted object is cut off in a case where the state of the first protection circuit is a closing failure and the detection result of the second detection section indicates that the state of the second protection circuit is either a closed state, the closing failure, or an opening failure, the closing failure being a failure in which opening is impossible due to a failure, the opening failure being a failure in which closing is impossible due to a failure.

BRIEF DESCRIPTION OF DRAWINGS

The advantageous and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
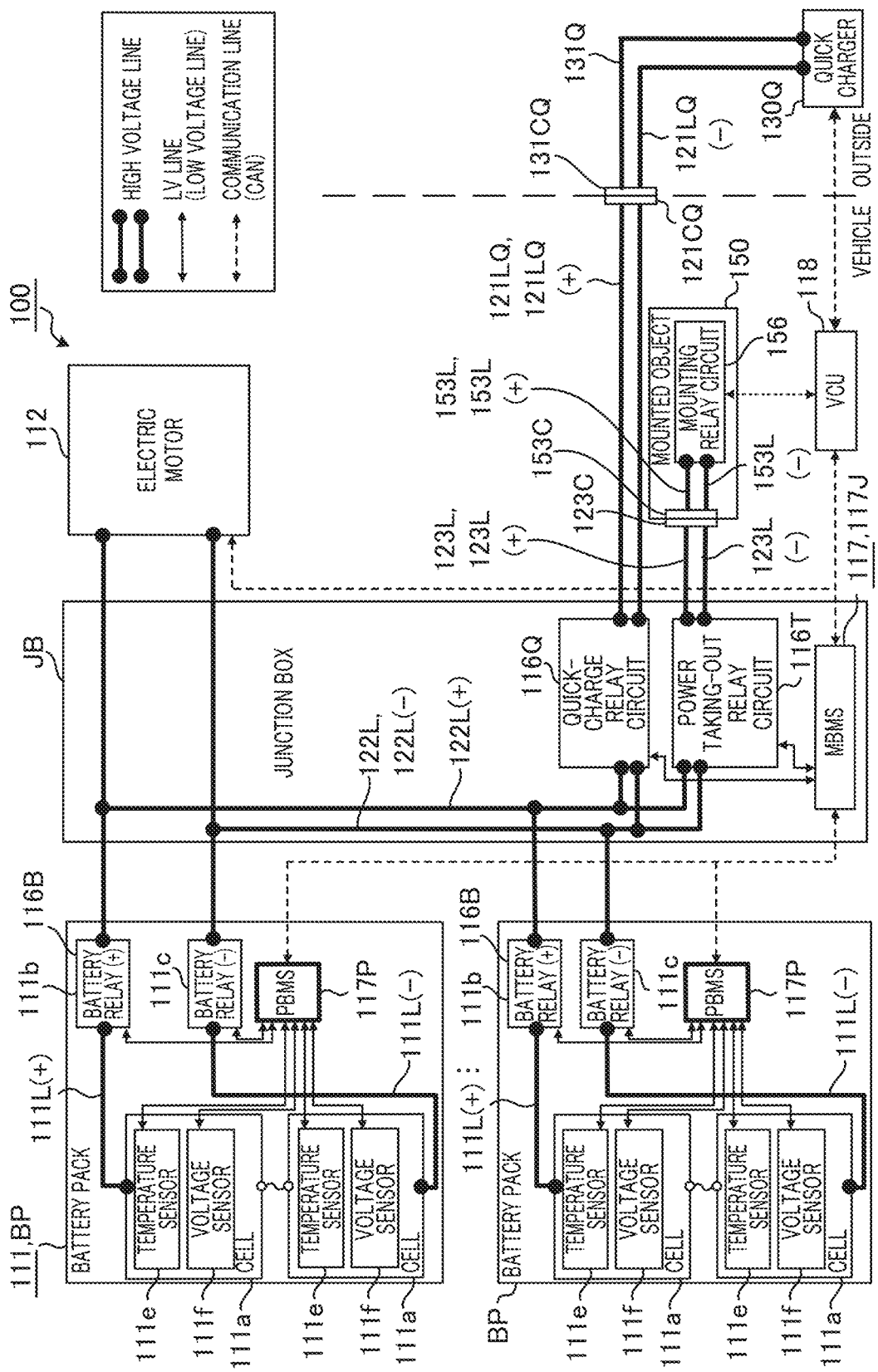
FIG. 1 illustrates an exemplary power system of an electric vehicle in an embodiment in the present disclosure.

Hereinafter, an embodiment of the present disclosure will be described with reference to the drawings. FIG. 1 illustrates an exemplary power system of an electric vehicle in an embodiment in the present disclosure. Electric vehicle (EV) 100 in the present embodiment is an electric work vehicle including battery 111, electric motor 112 for traveling that is driven by power of battery 111, and vehicle body 110 equipped with mounted object 150 that performs a predetermined work using the power of battery 111. Note that electric vehicle 100 in the present embodiment includes, for example, a load such as a heater (not illustrated), in addition to electric motor 112 and mounted object 150, but a description of the load will be omitted for simplicity of description of the embodiment.

(Battery 111)

Battery 111 is a secondary battery that is charged by an external power source. Battery 111 includes one or a plurality of battery packs BP. Each of the plurality of battery packs BP has the same configuration; hence, one battery pack BP among the plurality of battery packs BP will be representatively described. Battery pack BP includes a plurality of cells 111a, battery relay (+) 111b, battery relay (−) 111c, and battery-pack management system (PBMS) 117P. Incidentally, battery relay (+) 111b and battery relay (−) 111c are collectively referred to as "battery relay circuit 116B." Battery relay circuit 116B may be referred to as a "fourth protection circuit."

One terminal of battery relay (+) 111b is connected to a positive terminal of cell 111a via high voltage line 111L (+). The other terminal of battery relay (+) 111b is connected to high voltage line 122L (+). One terminal of battery relay (−) 111c is connected to a negative terminal of cell 111a via high voltage line 111L (−). The other terminal of battery relay (−) 111c is connected to high voltage line 122L (−).

Cell 111a includes temperature sensor 111e and voltage sensor 111f. Temperature sensor 111e detects a cell temperature. Temperature sensor 111e outputs a detection result (cell temperature) to battery-pack management system 117P. Voltage sensor 111f detects a cell voltage. Voltage sensor 111f outputs a detection result (cell voltage) to battery-pack management system 117P. Voltage sensor 111f may be referred to as a "fourth detection section."

Battery-pack management system 117P controls battery relay (+) 111b such that connection/disconnection between high voltage line 111L (+) and high voltage line 122L (+) is performed, and also controls battery relay (−) 111c such that connection/disconnection between high voltage line 111L (−) and high voltage line 122L (−) is performed, based on the input cell temperature and cell voltage, respectively.

(Junction Box JB)

Vehicle body 110 includes junction box JB. Junction box JB is placed between battery pack BP, and electric motor 112 and quick charger 130Q. Junction box JB includes quick-charge relay circuit 116Q, power taking-out relay circuit 116T, and battery management system 117J (MBMS). Note that battery-pack management system 117P and battery management system 117J are collectively referred to as "battery management section 117." Power taking-out relay circuit 116T may be referred to as a "first protection circuit."

One terminal (+) of quick-charge relay circuit 116Q is connected to high voltage line 122L (+). The other terminal (+) of quick-charge relay circuit 116Q is connected to connector 121CQ via high voltage line 121LQ (+). One terminal (−) of quick-charge relay circuit 116Q is connected to high voltage line 122L (−). The other terminal (−) of quick-charge relay circuit 116Q is connected to connector 121CQ via high voltage line 121LQ (−). Battery management system 117J controls, based on an instruction of vehicle control section 118 (Vehicle Control Unit (VCU)), quick-charge relay circuit 116Q such that connection/disconnection between high voltage line 122L (+) and high voltage line 121LQ (+) and connection/disconnection between high voltage line 122L (−) and high voltage line 121LQ (−) are performed. In the following description, high voltage line 121LQ (+) and high voltage line 121LQ (−) are collectively referred to as "power supply line 121LQ." Moreover, high voltage line 122L (+) and high voltage line 122L (−) are collectively referred to as "power supply line 122L." Power supply line 121LQ and power supply line 122L may be referred to as a "third power supply line."
(Connector 121CQ)
(Vehicle Body 110)

Vehicle body 110 includes connector 121CQ. Connector 121CQ is also referred to as a charge port or a port. Connector 121CQ is a quick-charge connector to which connector 131CQ is electrically connectable.
(Quick Charger 130Q)

Quick charger 130Q is placed outside vehicle body 110. Quick charger 130Q includes charging cable 131Q extended from its main body and connector 131CQ provided at a tip of charging cable 131Q. The electric connection of connector 131CQ to connector 121CQ enables quick charger 130Q to charge battery 111 at a high voltage.

Vehicle body 110 includes an ignition switch (not illustrated) that is a switch for turning on/off a starter relay (not illustrated). For example, when the starter relay is turned on (key-on operation), power is transmitted from battery 111 to a coil of battery relay circuit 116B (not illustrated). Thereby battery relay circuit 116B is turned on, and thus, power is supplied from battery 111 to electric motor 112 through battery relay circuit 116B (electric motor is activated). When the starter relay is turned off (key-off operation), battery relay circuit 116B is also turned off and the power from battery 111 to electric motor 112 is thus cut off (electric motor is stopped).
(Power Supply Line 121LQ, Power Supply Line 122L, and Quick-Charge Relay Circuit 116Q)

As illustrated in FIG. 1, quick-charge relay circuit 116Q is installed on power supply lines 121LQ and 122L. Power supply line 121LQ electrically connects between connector 121CQ and quick-charge relay circuit 116Q. Power supply line 121LQ includes high voltage line 121LQ (+) and high voltage line 121LQ (−). Power supply line 122L electrically connects between battery 111 and quick-charge relay circuit 116Q. Power supply line 122L includes high voltage line 122L (+) and high voltage line 122L (−). Note that quick-charge relay circuit 116Q may also be referred to as a "third protection circuit."

Figure 2:
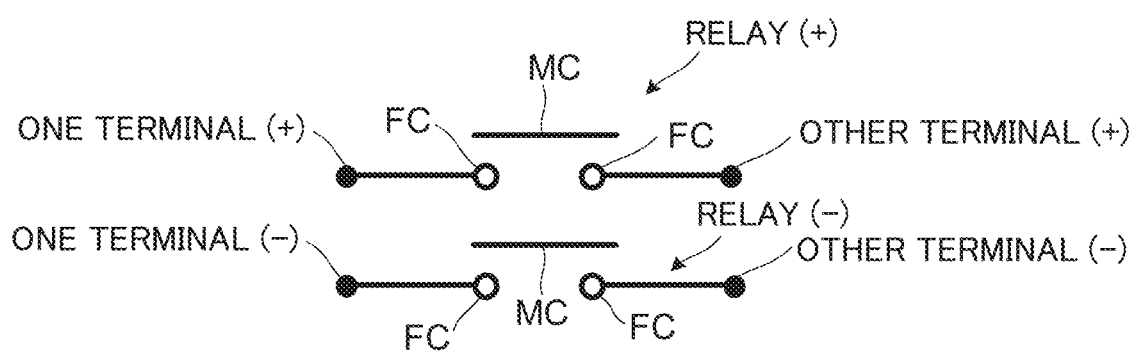
FIG. 2 schematically illustrates an exemplary relay circuit for quick charge.

FIG. 2 illustrates an exemplary quick-charge relay circuit. Quick-charge relay circuit 116Q includes a relay (+) and a relay (−). The relay (+) includes a coil (not illustrated), one terminal (+), the other terminal (+), movable contact MC, one-side fixed contact FC provided on a side of the one terminal (+), and other-side fixed contact FC provided on a side of the other terminal (+). High voltage line 121LQ (+) is connected to the one terminal (+) of the relay (+). High voltage line 122L (+) is connected to the other terminal (+) of the relay (+). The relay (−) includes a coil (not illustrated), one terminal (−), the other terminal (−), movable contact MC, one-side fixed contact FC provided on a side of the one terminal (−), and other-side fixed contact FC provided on a side of the other terminal (−). High voltage line 121LQ (−) is connected to the one terminal (−) of the relay (−). High voltage line 122L (−) is connected to the other terminal (−) of the relay (−).

In each of the relay (+) and relay (−), when the current flows through the coil, movable contact MC is attracted by an electromagnetic force and is thus brought into an electric contact with one-side fixed contact FC and other-side fixed contact FC. When no current flows through the coil, movable contact MC returns to its original position and is thus separated from each of one-side fixed contact FC and other-side fixed contact FC. Separation of movable contact MC of the relay (+) from one-side fixed contact FC and other-side fixed contact FC on the relay (+) side or separation of movable contact MC of the relay (−) from one-side fixed contact FC and other-side fixed contact FC of the relay (−) side causes power supply lines 121LQ and 122L to be electrically disconnected. This makes it possible to cut off power supplied from quick charger 130Q to battery 111.

In either the relay (+) or the relay (−) of quick-charge relay circuit 116Q, a state in which movable contact MC is welded to each of one-side fixed contact FC and other-side fixed contact FC and thus cannot be separated is referred to as a "welding failure of relay," a "single-welding failure of relay" or simply as a "single-welding failure." In addition, a state in which, in both the relay (+) and the relay (−), movable contact MC is welded to each of one-side fixed contact FC and other-side fixed contact FC and thus cannot be separated is referred to as a "double-welding failure of relay" or simply as a "double-welding failure." Further, either or both of the single-welding failure and double-welding failure is/are collectively referred to as a "welding failure."
(Power Supply Line 122 L, Power Supply Line 123 L, and Power Taking-Out Relay Circuit 116 T)

As illustrated in FIG. 1, power taking-out relay circuit 116T is installed on power supply lines 122L and 123L. Power supply line 122L electrically connects between battery 111 and power taking-out relay circuit 116T. Power supply line 123L electrically connects between power taking-out relay circuit 116T and connector 123C. Power supply line 123L includes high voltage line 123L (+) and high voltage line 123L (−). Power supply line 122L and power supply line 123L may be referred to as a "first power supply line."

Power taking-out relay circuit 116T includes a relay (+) and a relay (−). The relay (+) and the relay (−) have the same configurations as the relay (+) and the relay (−) in quick-charge relay circuit 116Q; hence, the same reference numerals are given to the same elements, and the descriptions thereof will be omitted. High voltage line 122L (+) is connected to one terminal (+) of the relay (+). High voltage line 123L (+) is connected to the other terminal (+) of the relay (+). High voltage line 122L (−) is connected to one terminal (−) of the relay (−). High voltage line 123L (−) is connected to the other terminal (−) of the relay (−).

Separation of movable contact MC of the relay (+) from one-side fixed contact FC and other-side fixed contact FC on the relay (+), or separation of movable contact MC of the relay (−) from one-side fixed contact FC and other-side fixed contact FC of the relay (−) makes it possible to cut off power supplied from battery 111 to a side of mounted object 150 (mounting relay circuit 156).

In either the relay (+) or the relay (−) of power taking-out relay circuit 116T, a state in which movable contact MC is welded to each of one-side fixed contact FC and other-side fixed contact FC and thus cannot be separated is referred to as a "welding failure of relay," a "single-welding failure of relay" or simply as a "single-welding failure." In addition, a state in which, in both the relay (+) and the relay (−), movable contact MC is welded to each of one-side fixed contact FC and other-side fixed contact FC and thus cannot be separated is referred to as a "double-welding failure of relay" or simply as a "double-welding failure." Further, either or both of the single-welding failure and double-welding failure is/are collectively referred to as a "welding failure."
(Connector 123C)

Connector 123C is electrically connected to connector 153C provided at mounted object 150.

(Mounted Object 150)

Mounted object 150 includes, in addition to connector 153C, a load (not illustrated), power supply line 153L, communication section 155, mounting relay circuit 156, detection section 157, and control section 158. Mounting relay circuit 156 may be referred to as a "second protection circuit."

(Power Supply Line 153 L and Mounting Relay Circuit 156)

High voltage line 153L electrically connects between connector 153C and mounting relay circuit 156. Power supply line 153L includes high voltage line 153L (+) and high voltage line 153L (−). Mounting relay circuit 156 includes a relay (+) and a relay (−). The relay (+) and the relay (−) have the same configurations as the relay (+) and the relay (−) in quick-charge relay circuit 116Q; hence, the same reference numerals are given to the same elements, and the descriptions thereof will be omitted. High voltage line 153L (+) is connected to one terminal (+) of the relay (+). High voltage line 153L (−) is connected to one terminal (−) of the relay (−)

(Load on Mounted Object 150)

A load (not illustrated) is, for example, an electric motor. The load is electrically connected to mounting relay circuit 156 via a power supply line (not illustrated). That is, the load (electric motor) is operated by power received from battery 111 via power supply line 122L, power taking-out relay circuit 116T, power supply line 123L, power supply line 153L, mounting relay circuit 156, and the power supply line (not illustrated). The power supply line that is not illustrated includes a high voltage line (+) and a high voltage line (−). The high voltage line (+) is connected to the other terminal (+) of the relay (+). High voltage line L (−) is connected to the other terminal (−) of the relay (−). Power supply line 153L and the power supply line that is not illustrated may be referred to as a "second power supply line." Incidentally, the second power supply line is electrically connected/disconnected by control section 158 executing close/open control of mounting relay circuit 156.

The relay (+) and the relay (−) in mounting relay circuit 156 have the same configurations as the relay (+) and the relay (−) in quick-charge relay circuit 116Q; hence, the same reference numerals are given to the same elements, and the descriptions thereof will be omitted.

Separation of movable contact MC of the relay (+) from one-side fixed contact FC and other-side fixed contact FC on the relay (+), or separation of movable contact MC of the relay (−) from one-side fixed contact FC and other-side fixed contact FC of the relay (−) makes it possible to cut off power supplied from battery 111 to the load (not illustrated) via power supply line 153L and the power supply line (not illustrated). In either the relay (+) or the relay (−) of mounting relay circuit 156, a state in which movable contact MC is welded to each of one-side fixed contact FC and other-side fixed contact FC and thus cannot be separated is referred to as a "welding failure of relay," a "single-welding failure of relay" or simply as a "single-welding failure." In addition, a state in which, in both the relay (+) and the relay (−), movable contact MC is welded to each of one-side fixed contact FC and other-side fixed contact FC and thus cannot be separated is referred to as a "double-welding failure of relay" or simply as a "double-welding failure." Further, either or both of the single-welding failure and double-welding failure is/are collectively referred to as a "welding failure."

(Detection Section 157)

Detection section 157 detects each of the following states of mounting relay circuit 156: open state; closed state; opening failure; and welding failure (closing failure). Detection section 157 also outputs an error signal indicating that a state of mounting relay circuit 156 cannot be detected. Detection section 157 may be referred to as a "second detection section." Further, a detection signal of each of the opening failure and welding failure, and the error signal may be referred to as an "abnormality signal from mounted object side" or simply as an "abnormality signal". Here, the term "opening failure" refers to a state where closing is impossible due to a failure.

(Control Section 158)

Control section 158 is a processor such as a Central Processing Unit (CPU) or a Graphics Processing Unit (GPU), and executes a program stored in a storage apparatus (not illustrated) so as to centrally control a plurality of devices composing mounted object 150. In addition, control section 158 acquires an abnormality signal and controls communication section 155 such that the acquired abnormality signal is transmitted to communication section 115.

(Communication Section 155)

Exchange of information between communication sections 155 and 115 is made via any means. For example, communication section 155 and communication section 115 are connected to each other by communication network NW including a function that enables wireless internet communication. This allows communication section 155 to transmit the abnormality signal from the side of mounted object 150 to a side of vehicle body 110.

(Communication Section 115)

Communication section 115 transmits and receives information to and from communication section 155. Communication section 115 may be referred to as a "reception section." Communication section 155 may be referred to as a "transmission section."

(Storage Section 113)

Storage section 113 is a storage apparatus such as a Read Only Memory (ROM) that stores therein a Basic Input Output System (BIOS) of a computer for realizing control section 119, a Random Access Memory (RAM) that serves as a work area of control section 119, and a Hard Disk Drive (HDD) and a Solid State Drive (SSD) that store therein an Operating System (OS), an application program, various pieces of information to be referred to when the application program is executed.

(Control Section 119)

Figure 3:
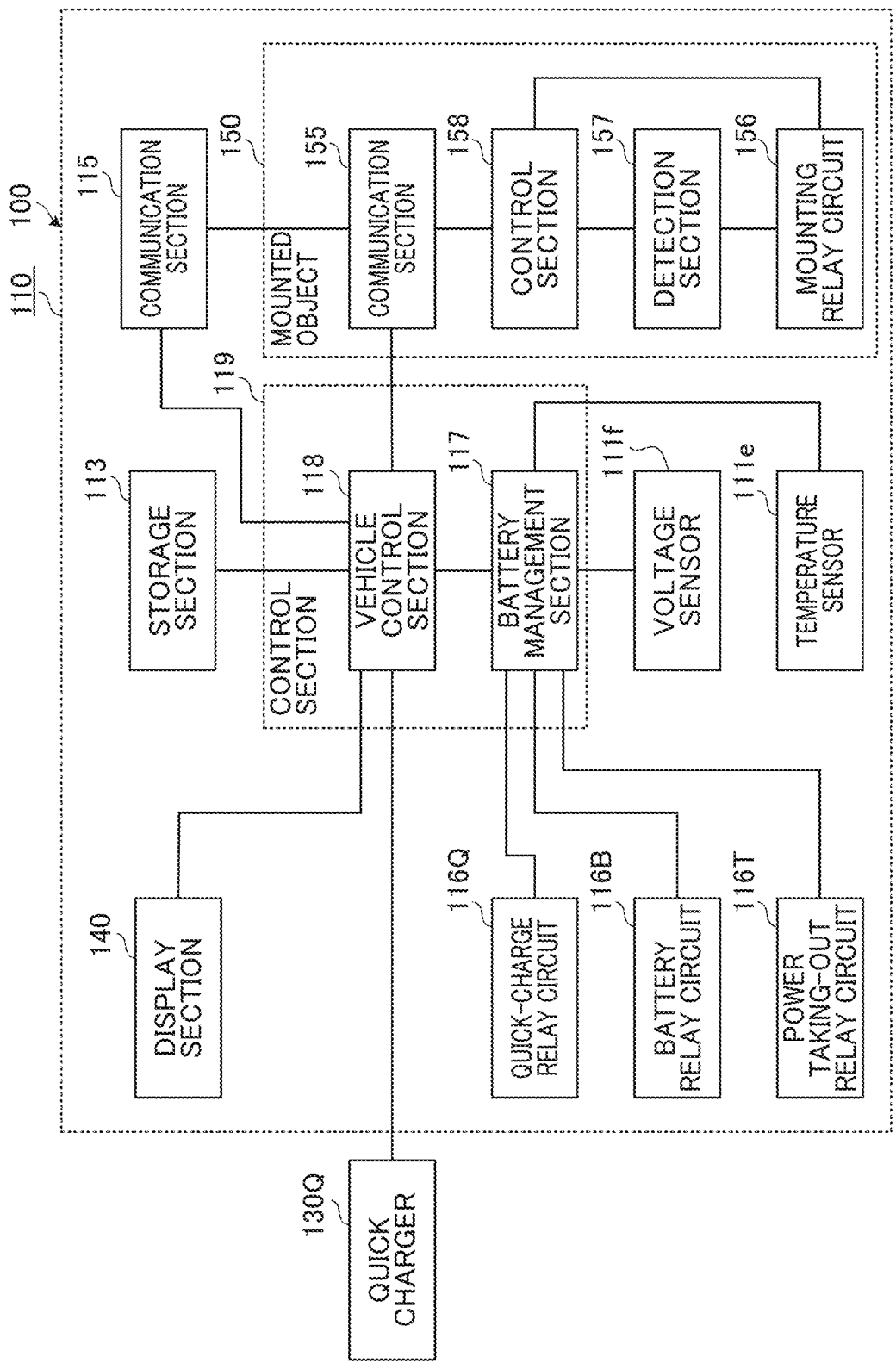
FIG. 3 is a configuration block diagram illustrating the exemplary power system of the electric vehicle in the embodiment of the present disclosure.

Next, control section 119 will be described with reference to FIGS. 1 and 3. FIG. 3 is a configuration block diagram illustrating the exemplary power system of the electric vehicle in the embodiment of the present disclosure.

Control section 119 is a processor such as a Central Processing Unit (CPU) and a Graphics Processing Unit (GPU) and has various functions by executing a program stored in storage section 113.

Control section 119 executes control in accordance with a state of each of quick-charge relay circuit 116Q, power taking-out relay circuit 116T, and mounting relay circuit 156, from the viewpoint of improving safety and protecting battery 111.

Control section 119 stores predetermined information in storage section 113. Control section 119 causes display section 140 to display the predetermined information. The predetermined information stored in storage section 113 includes, for example, information indicating the welding failure (single-welding failure or double-welding failure) of each of quick-charge relay circuit 116Q and power taking-out relay circuit 116T.

Control section 119 is realized by, for example, computing resources such as a plurality of processors and memories. In this case, each component composing control section 119 is realized by at least one processor among the plurality of different processors executing a program. Control section 119 may be composed of a single apparatus. In this case, for example, control section 119 may be composed of all of battery management section 117 and vehicle control section 118 illustrated in FIG. 3. Alternatively, control section 119 may be composed of a plurality of apparatuses. In this case, for example, control section 119 may be composed of each of battery management section 117 and vehicle control section 118, or may be composed of a combination of the two and another apparatus.

As mentioned above, battery-pack management system 117P and battery management system 117J are collectively referred to as "battery management section 117." In the present embodiment, battery management section 117 and vehicle control section 118 are assumed to be included in control section 119. Battery management section 117 may be provided at vehicle body 110 as a separate apparatus from vehicle control section 118.

(Battery Management Section 117)

Battery management section 117 executes, based on a state of battery 111 (e.g., cell temperature or cell voltage), close/open control of battery relay circuit 116B such that connection/disconnection between high voltage line 111L and power supply line 122L is performed.

Battery management section 117 also executes, based on a state of battery 111 (e.g., State Of Charge (SOC)), close/open control of quick-charge relay circuit 116Q such that connection/disconnection between power supply line 121LQ and power supply line 122L is performed.

Battery management section 117 also includes a third detection section (not illustrated) that detects each of the following states of quick-charge relay circuit 116Q: open state; closed state; opening failure; and welding failure (closing failure). The third detection section outputs, as a detection result, a relay-state signal indicating the state of quick-charge relay circuit 116Q. The third detection section also outputs an error signal indicating that a state of quick-charge relay circuit 116Q cannot be detected.

Further, battery management section 117 determines, based on the detection result of the third detection section, whether a welding failure (single-welding failure or double-welding failure) has occurred in quick-charge relay circuit 116Q (welding diagnosis). Battery management section 117 performs the welding diagnosis at a predetermined timing and performs Control Area Network (CAN) transmission of information thereon (determination result on quick-charge relay circuit 116Q) to vehicle control section 118. For example, battery management section 117 performs the welding diagnosis at a key-off time and stores information thereon in, for example, an internal memory, then performing the CAN transmission of the information to vehicle control section 118 at the next key-on time (at start-up). Here, the phrase "CAN transmission of information" refers to transmitting information over a CAN bus.

Further, when quick-charge relay circuit 116Q has the double-welding failure, battery management section 117 executes open control of battery relay circuit 116B.

Meanwhile, when quick-charge relay circuit 116Q has the single-welding failure, battery management section 117 executes open control of quick-charge relay circuit 116Q even upon receiving a request for closing from vehicle control section 118 which is a higher component.

Further, battery management section 117 controls battery relay circuit 116B such that the power supplied from battery 111 to mounted object 150 is cut off when a state of power taking-out relay circuit 116T (first protection circuit) is the closing failure and a detection result of detection section 157 (second detection section) indicates that a state of mounting relay circuit 156 (second protection circuit) is either the closed state, closing failure, or opening failure.

Battery management section 117 also determines whether the third detection section has failed, based on the error signal output from the third detection section. Battery management section 117 performs the CAN transmission of a determination result on the third detection section to vehicle control section 118.

Further, when receiving an abnormality signal from vehicle control section 118 (abnormality signal from mounted object), battery management section 117 executes a protective operation as battery management section 117, for example, the open control of power taking-out relay circuit 116T.

Battery management section 117 also includes a first detection section (not illustrated) that detects each of the following states of power taking-out relay circuit 116T: open state; closed state; opening failure; and welding failure (closing failure). The first detection section outputs, as a detection result, a relay-state signal indicating the state of power taking-out relay circuit 116T. The first detection section also outputs an error signal indicating that a state of power taking-out relay circuit 116T cannot be detected.

Further, battery management section 117 determines, based on the detection result of the first detection section, whether a welding failure (single-welding failure or double-welding failure) has occurred in power taking-out relay circuit 116T (welding diagnosis). Battery management section 117 performs the welding diagnosis at a predetermined timing and performs CAN transmission of information thereon (determination result on power taking-out relay circuit 116T) to vehicle control section 118. For example, battery management section 117 performs the welding diagnosis at a key-off time and stores information thereon in, for example, an internal memory, then performing the CAN transmission of the information to vehicle control section 118 at the next key-on time (at start-up).

Battery management section 117 also determines whether the first detection section has failed, based on the error signal output from the first detection section. Battery management section 117 performs the CAN transmission of a determination result on the first detection section to vehicle control section 118.

(Vehicle Control Section 118)

Vehicle control section 118 (VCU) determines a state of electric vehicle 100 and executes control for keeping electric vehicle 100 in an optimum state. To be more specific, when detecting an abnormality in electric vehicle 100, vehicle control section 118 controls electric motor 112 such that electric vehicle 100 is stopped. Additionally, vehicle control section 118 controls supply power from battery 111 to electric motor 112 by varying a voltage between battery 111 and electric motor 112. Further, vehicle control section 118 controls supply power from battery 111 to the heater (not illustrated) by varying a voltage between battery 111 and the heater (not illustrated). Vehicle control section 118 also controls quick charger 130Q such that, for example, charging power for charging battery 111 does not exceed a chargeable power.

In addition, vehicle control section 118 executes control such that no power is supplied from battery 111 to the side of mounted object 150 when a state of power taking-out relay circuit 116T (first protection circuit) is the closing failure and a detection result of detection section 157 (second detection section) indicates an indefinite initial value and indicates that a state of mounting relay circuit 156 (second protection circuit) is the open state. Specifically, the use of mounted object 150 is prohibited. Moreover, an instruction is made on mounted object 150 to stop operation.

Further, when the first detection section that detects a state of power taking-out relay circuit 116T (first protection circuit) outputs an error signal (in a case of failure), vehicle control section 118 executes control to deal with the error signal in accordance with, for example, the state of power taking-out relay circuit 116T at the time of output of the error signal. Alternatively, when the third detection section that detects a state of quick-charge relay circuit 116Q (third protection circuit) outputs an error signal (in a case of failure), vehicle control section 118 executes control to deal with the error signal in accordance with, for example, the state of quick-charge relay circuit 116Q at the time of output of the error signal.

Figure 4:
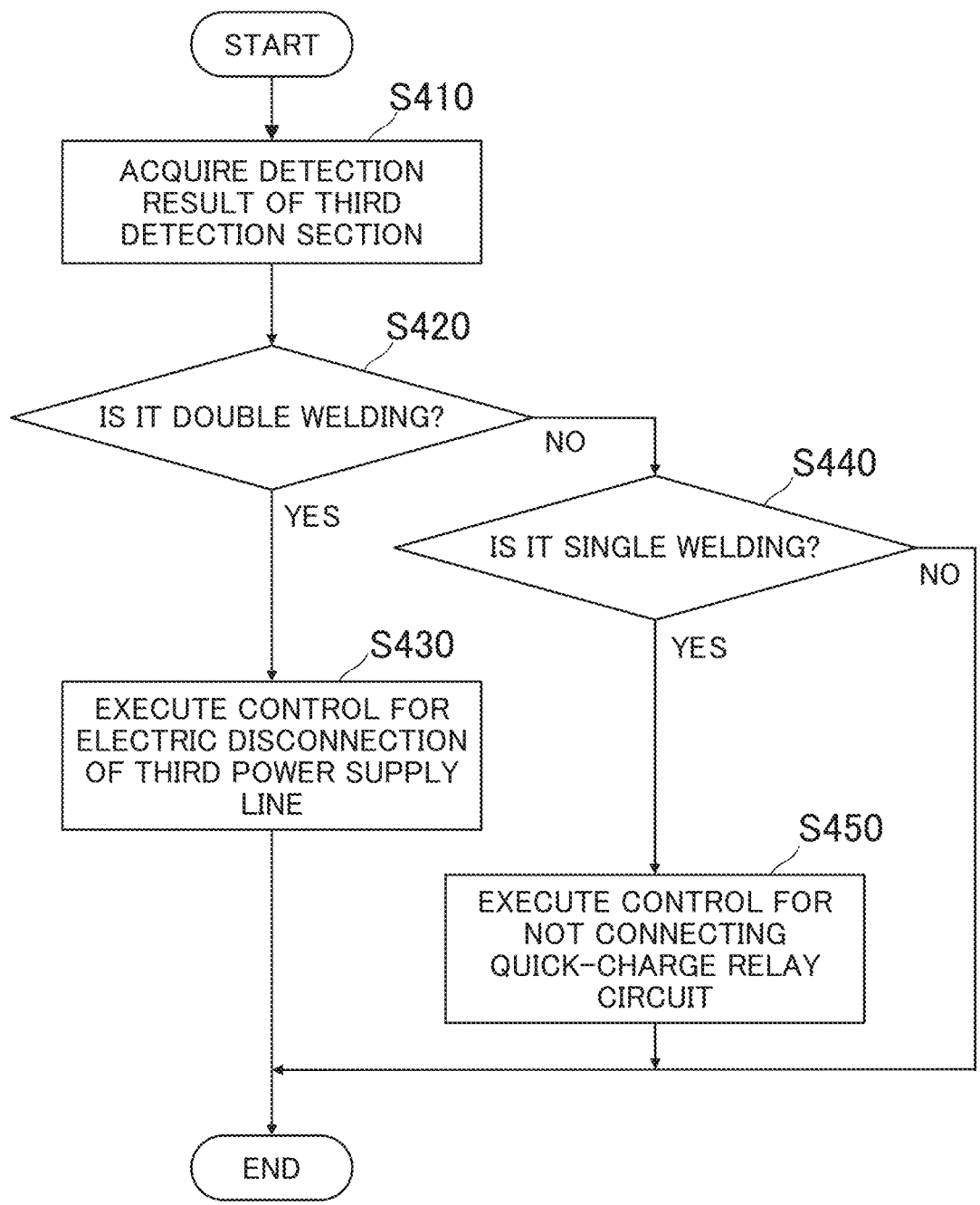
FIG. 4 is a flowchart describing an exemplary operation of a control section in the power system in the embodiment of the present disclosure.

Next, an exemplary operation of control section 119 in the present embodiment will be described with reference to FIG. 4. FIG. 4 is a flowchart describing an exemplary operation of control section 119 in the present embodiment. This flow is initiated when electric vehicle 100 is operated or when a mode is changed.

First, in step S410, battery management section 117 acquires a detection result of the third detection section (detection section included in battery management section 117).

Next, in step S420, battery management section 117 determines whether quick-charge relay circuit 116Q has a double welding. When a double welding is present (step S420: YES), processing proceeds to step S430. When a double welding is not present (step S420: NO), processing proceeds to step S440.

In step S430, control for electric disconnection of third power supply lines 121LQ and 122L is executed. After that, this flow ends.

In step S440, battery management section 117 determines whether quick-charge relay circuit 116Q has a single welding. When a single welding is present (step S440: YES), the process proceeds to step S150. When a single welding is not present (step S440: NO), this flow ends.

In step S450, battery management section 117 executes control for not connecting quick-charge relay circuit 116Q. After that, this flow ends.

Figure 5:
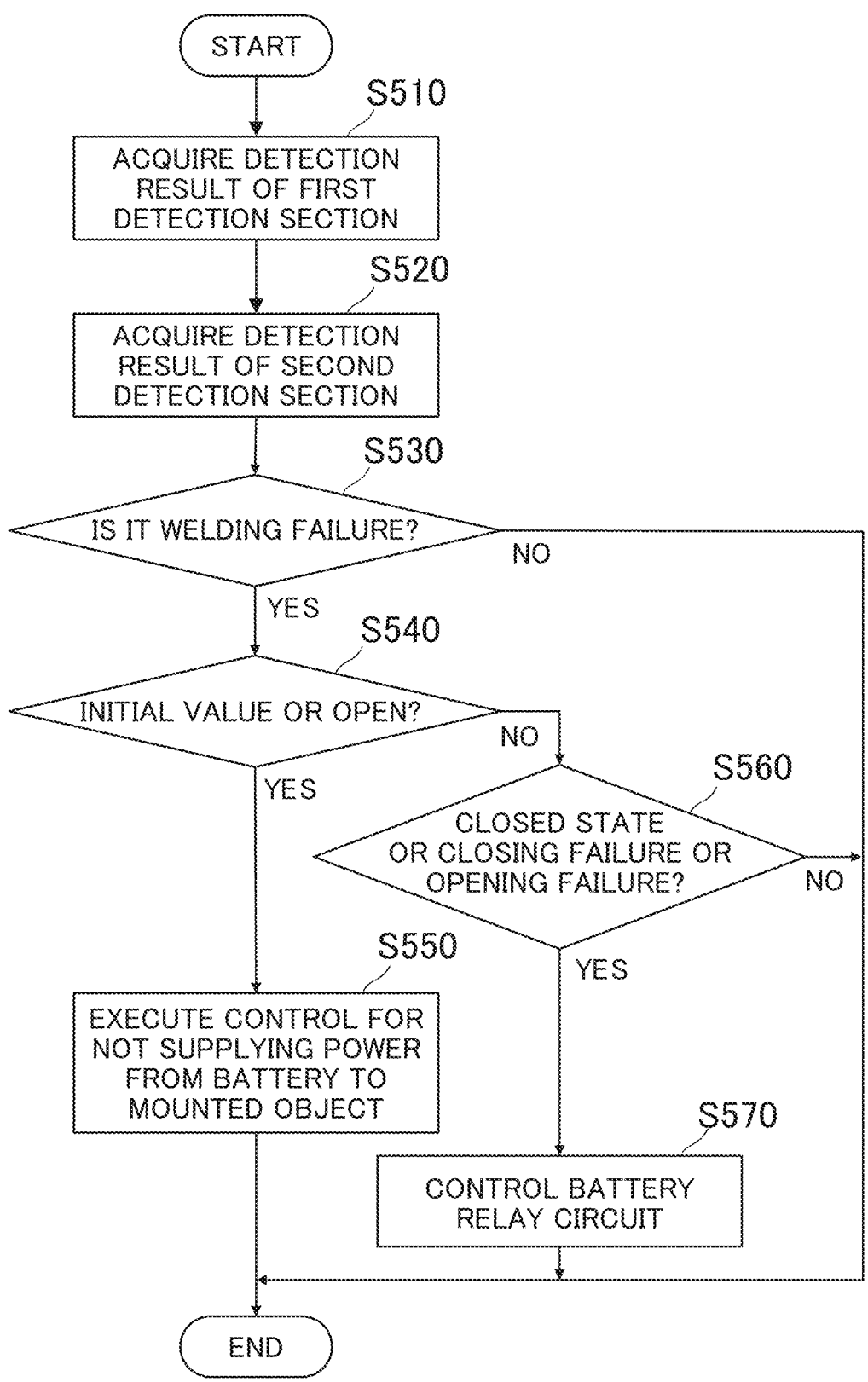
FIG. 5 is a flowchart describing another exemplary operation of the control section in the power system in the embodiment of the present disclosure.

Next, another exemplary operation of control section 119 in the present embodiment will be described with reference to FIG. 5. FIG. 5 is a flowchart describing another exemplary operation of control section 119 in the present embodiment.

First, in step S510, battery management section 117 acquires a detection result of the first detection section (detection section included in battery management section 117).

Next, in step S520, battery management section 117 acquires a detection result of detection section 157 (second detection section).

Next, in step S530, battery management section 117 determines whether power taking-out relay circuit 116T has a welding failure. When power taking-out relay circuit 116T has the welding failure (step S530: YES), processing proceeds to step S540. When power taking-out relay circuit 116T does not have the welding failure (step S530: NO), this flow ends.

In step S540, battery management section 117 determines whether or not the detection result of the second detection section indicates an initial value or indicates that mounting relay circuit 156 is open. When the detection result of the second detection section indicates the initial value or indicates that mounting relay circuit 156 is open (step S540: YES), processing proceeds to step S550. When the detection result of the second detection section does not indicate the initial value nor indicate that mounting relay circuit 156 is open (step S540: NO), processing proceeds to step S560.

In step S550, vehicle control section 118 executes control for not supplying power from battery 111 to mounted object 150. After that, this flow ends.

In step S560, battery management section 117 determines whether the detection result of the second detection section indicates that mounting relay circuit 156 has any one of a closed state, a closing failure, and an opening failure. When the detection result of the second detection section indicates that mounting relay circuit 156 has one of the closed state, closing failure, and opening failure (step S560: YES), processing proceeds to step S570. When the detection result of the second detection section does not indicate that mounting relay circuit 156 does not have one of the closed state, closing failure, and opening failure (step S560: NO), this flow ends.

In step S570, battery management section 117 controls battery relay circuit 116B such that power supplied from battery 111 is cut off. After that, this flow ends.

An electric vehicle in the above embodiment includes: battery 111 that supplies power to electric motor 112 for operation of vehicle body 110; third power supply lines 121LQ and 122L that include a positive-side line and a negative-side line and that supplies the power from quick charger 130Q placed outside the vehicle body to the battery, the positive-side line being on an upstream side of a current flowing from the quick charger 130Q to battery 111, the negative-side line being on a downstream side the current flowing from quick charger 130Q to battery 111; quick-charge relay circuit 116Q (third protection circuit) that is installed on the third power supply lines and that is capable of cutting off the power by electrically disconnecting the positive-side line and/or the negative-side line; a third detection section (detection section included in battery management section 117) that detects a state of quick-charge relay circuit 116Q; and control section 119 that controls battery relay circuit 116B for electrically disconnecting between battery 111 and third power supply lines 121LQ and 122L when determining, based on a detection result of the third detection section, that quick-charge relay circuit 116Q is in a state where each of the positive-side line and the negative-side line is not disconnectable due to a double welding of quick-charge relay circuit 116Q.

The above configuration makes it possible to electrically disconnect between battery 111 and third power supply lines 121LQ and 122L and to surely protect battery 111 when quick-charge relay circuit 116Q has the double welding. In addition, although the double welding involves a risk of electric shock from a charging port, since third power supply lines 121LQ and 122L are electrically disconnected, the risk of electric shock for a user can be suppressed.

Further, in the electric vehicle in the above embodiment, control section 119 further executes control for not connecting quick-charge relay circuit 116Q even when a connection request is made to quick-charge relay circuit 116Q when determining, based on the detection result of the third detection section (detection section included in battery management section 117), that quick-charge relay circuit 116Q (third protection circuit) is in a state where one of the positive-side line and the negative-side line is not disconnectable due to a single welding of quick-charge relay circuit 116Q. Charging/discharging under the single welding of quick-charge relay circuit 116Q cannot ensure a sufficient redundancy and may lead to the double-welding. By contrast, since quick-charge relay circuit 116Q is not connected to third power supply lines 121LQ and 122L even when the connection request is made to quick-charge relay circuit 116Q, the sufficient redundancy can be ensured. Thus, battery 111 can be surely protected.

Further, an electric vehicle in the above embodiment is an electric vehicle that includes: mounted object 150 operated by power; and vehicle body 110 equipped with mounted object 150, in which vehicle body 110 includes: first power supply lines 122L and 123L that supply power from battery 111 to mounted object 150; power taking-out relay circuit 116T (first protection circuit) that is installed on first power supply lines 122L and 123L and that is capable of supplying and cutting off the power by closing or opening; a first detection section (detection section included in battery management section 117) that detects a state of power taking-out relay circuit 116T; and communication section 115 that receives predetermined information, in which mounted object 150 includes: second power supply line 153L that is electrically connected to first power supply lines 122L and 123L; mounting relay circuit 156 (second protection circuit) that is installed on second power supply line 153L and that is capable of supplying and cutting off the power by closing or opening; detection section 157 (second detection section) that detects a state of mounting relay circuit 156; and transmission section 155 that transmits a detection result of detection section 157 as the predetermined information, and in which control section 119 executes control such that no power is supplied from battery 111 to mounted object 150 in a case where the state of power taking-out relay circuit 116T (first protection circuit) is a closing failure and the detection result of detection section 157 indicates an initial value or indicates that the state of mounting relay circuit 156 is an open state, the closing failure being a failure in which opening is impossible due to a failure. This makes it possible to surely protect battery 111 by vehicle control section 118 executing the control in accordance with the state of mounting relay circuit 156 even when the state of power taking-out relay circuit 116T is the closing failure.

Further, an electric vehicle in the above embodiment is an electric vehicle that includes: mounted object 150 operated by power; and vehicle body 110 equipped with mounted object 150, in which vehicle body 110 includes: first power supply lines 122L and 123L that supply power from battery 111 to mounted object 150; power taking-out relay circuit 116T (first protection circuit) that is installed on first power supply lines 122L and 123L and that is capable of supplying and cutting off the power by closing or opening; a first detection section (detection section included in battery management section 117) that detects a state of power taking-out relay circuit 116T; and communication section 115 that receives predetermined information, in which mounted object 150 includes: second power supply line 153L that is electrically connected to first power supply lines 122L and 123L; mounting relay circuit 156 (second protection circuit) that is installed on second power supply line 153L and that is capable of supplying and cutting off the power by closing or opening; detection section 157 (second detection section) that detects a state of mounting relay circuit 156; and transmission section 155 that transmits a detection result of detection section 157 as the predetermined information, and in which battery 111 includes battery relay circuit 116B (fourth protection circuit) that is capable of cutting off the power supplied to mounted object 150, and vehicle control section 118 controls battery relay circuit 116B such that the power supplied to mounted object 150 is cut off in a case where the state of power taking-out relay circuit 116T (first protection circuit) is a closing failure and the detection result of detection section 157 (second detection section) indicates that the state of mounting relay circuit 156 is either a closed state, the closing failure, or an opening failure, the closing failure being a failure in which opening is impossible due to a failure, the opening failure being a failure in which closing is impossible due to a failure. This makes it possible to surely protect battery 111 by battery management section 117 executing the control in accordance with the state of mounting relay circuit 156 even when the state of power taking-out relay circuit 116T is the closing failure.

The embodiment described above is merely an example of specific implementation of the present invention, and the technical scope of the present invention should not be restrictively interpreted by this embodiment. That is, the present invention may be implemented in various forms without departing from the spirit thereof or the major features thereof.

INDUSTRIAL APPLICABILITY

The present disclosure is suitable for use in an electric vehicle equipped with a power supply apparatus required to surely protect a battery.

The invention claimed is:

1. An electric vehicle that includes a mounted object operated by electric power and a vehicle body equipped with the mounted object, the electric vehicle comprising:
   a battery that supplies power to an electric motor for operation of the vehicle body;
   a first power supply line that is provided inside the vehicle body and connected to the battery and that supplies power from the battery to the mounted object;
   a first protection circuit that is installed on the first power supply line and is capable of supplying/cutting off the power by closing/opening;
   a first detector that detects a state of the first protection circuit;
   a second power supply line that is provided inside the vehicle body extending from the first power supply line and that connects the first power supply line with a load of the mounted object;
   a second protection circuit that is installed on the second power supply line and is capable of supplying/cutting off the power by closing/opening;
   a second detector that detects a state of the second protection circuit;
   a third power supply line that is provided inside the vehicle body and branches off from the first power supply line to a path separate from the mounted object side, the third power supply line including a positive-side line and a negative-side line and supplying the power from a quick charger placed outside the vehicle body to the battery, the positive-side line being on an upstream side of a current flowing from the quick charger to the battery, the negative-side line being on a downstream side the current flowing from the quick charger to the battery;
   a third protection circuit that is installed on the third power supply line and that is capable of cutting off the power by electrically disconnecting the positive-side line and/or the negative-side line;

a third detector that detects a state of the third protection circuit;

a fourth protection circuit that is provided inside the battery and that is capable of electrically disconnecting the battery from outside the battery by closing/opening; and a control section that is communicatively connected to each unit in the electric vehicle;

wherein the control section executes the following controls a) to d) from the viewpoint of protecting the battery;

a) when it is determined that the third protection circuit is in a double welding state based on the detection result of the third detector, the control section switches the fourth protection circuit to an open state to electrically disconnect the battery from the third power supply line, b) when it is determined that the third protection circuit is in a single welding state based on the detection result of the third detector, the control section controls the third protection circuit to be open even if a connection request is made to the third protection circuit, c) when it is determined that the state of the first protection circuit is a close failure that cannot be opened due to a failure based on the detection result of the first detector, and if the detection result of the second detector indicates an initial value with an indefinite numerical value or indicates that the state of the second protection circuit is open, the control section prohibits the use of the mounted object or instructs the mounted object to stop operating, and d) when it is determined that the state of the first protection circuit is a closed failure that cannot be opened due to a failure, and the detection result of the second detector indicates, based on the detection result of the first detector, that the state of the second protection circuit is either a closed state, a closed failure that cannot be opened due to a failure, or an open failure that cannot be closed due to a failure, the control section switches the fourth protection circuit to an open state to cut off the power supplied from the battery to the mounted object.

* * * * *